United States Patent [19]

Ohta

[11] Patent Number: 5,463,544
[45] Date of Patent: Oct. 31, 1995

[54] PROGRAMMABLE CONTROLLER AND METHOD OF MONITORING A SEQUENCE PROGRAM THEREOF

[75] Inventor: Shun Ohta, Nagoya, Japan

[73] Assignee: Mitsubishi Denki Kabushiki Kaisha, Tokyo, Japan

[21] Appl. No.: 307,029

[22] Filed: Sep. 16, 1994

Related U.S. Application Data

[63] Continuation of Ser. No. 861,021, Mar. 31, 1992, abandoned.

[30] Foreign Application Priority Data

| Apr. 1, 1991 | [JP] | Japan | 3-068456 |
| Oct. 21, 1991 | [JP] | Japan | 3-272387 |

[51] Int. Cl.⁶ .......................... G06F 9/00; G05B 19/05
[52] U.S. Cl. .................... 364/147; 364/DIG. 2;
  364/926.9; 364/949; 364/955.3; 395/183.1;
  395/183.22; 395/183.14
[58] Field of Search ..................... 364/140, 141,
  364/146, 147, DIG. 2 MS File; 395/275,
  375

[56] References Cited

U.S. PATENT DOCUMENTS

| 4,616,307 | 10/1986 | Kusumi et al. | 364/147 |
| 4,633,384 | 12/1986 | Kusumi | 364/147 X |
| 4,683,549 | 7/1987 | Takaki | 364/147 X |
| 4,941,081 | 7/1990 | Kumar et al. | 364/142 X |
| 4,982,358 | 1/1991 | Tanaka et al. | 364/147 X |
| 5,126,956 | 6/1992 | Komiya et al. | 364/147 X |

OTHER PUBLICATIONS

"Der Elektroniker", No. 10, 1988, pp. 77–81.
"Elektronik", special issue II, Operation of Debugging Programs, 1978, pp. 64–66.
German Office Action, File No. P 42 10 844.6–53, dated Jul. 8, 1993.

*Primary Examiner*—Joseph Ruggiero
*Attorney, Agent, or Firm*—Sughrue, Mion, Zinn, Macpeak & Seas; Richard C. Turner; Marc Kaufman

[57] ABSTRACT

A programmable controller comprises a program apparatus and a CPU unit. The program apparatus displays, on a screen, a program of an arbitrary sequence step in a sequence program programmed in the CPU unit, to monitor a device condition of the sequence program displayed during execution of the CPU unit. The CPU unit transmits an arbitrary device having an index qualification and a condition of the arbitrary device to the program apparatus during execution of the programmed sequence program. Similarly, the CPU unit can transmit the arbitrary device and the condition thereof in accordance with a condition of an index specified by an operator.

19 Claims, 21 Drawing Sheets

| | FIG.4(a) | FIG.4(b) | FIG.4(c) |
|---|---|---|---|
| STEP NO. | | 11 | 12 |
| DEVICE AND NO. BEFORE INDEX QUALIFICATION | | X0 | Y10 |
| INDEX AND NO. | | Z0 | Z1 |
| CONTENTS OF THE AFORESAID INDEX AFTER EXECUTON OF THE AFOREMENTIONED STEP NO. | | 5 | 8 |
| CONTENTS OF DEVICE AFTER INDEX QUALIFICATION OF THE AFORESAID DEVICE | | ON | ON |

FIG.11(a)

| STEP NO. |
|---|
| DEVICE AND NO. AFTER INDEX QUALIFICATION AFTER EXECUTION OF THE AFORESAID STEP NO. |
| CONTENTS OF DEVICE AFTER INDEX QUALIFICATION OF THE AFOREMENTIONED DEVICE |

FIG.11(b)

| 11 |
|---|
| X 5 |
| ON |

FIG.11(c)

| 12 |
|---|
| Y 18 |
| ON |

FIG.19(a)
PRIOR ART
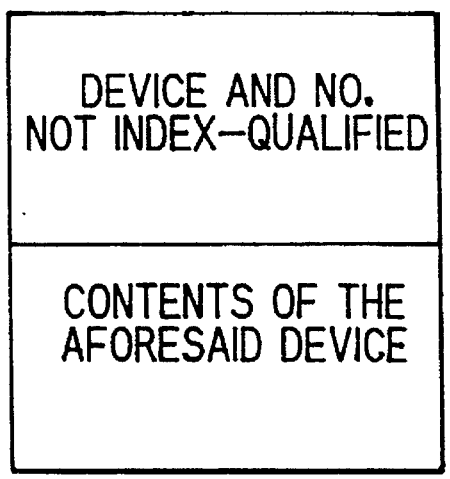
FIG.19(b)
PRIOR ART
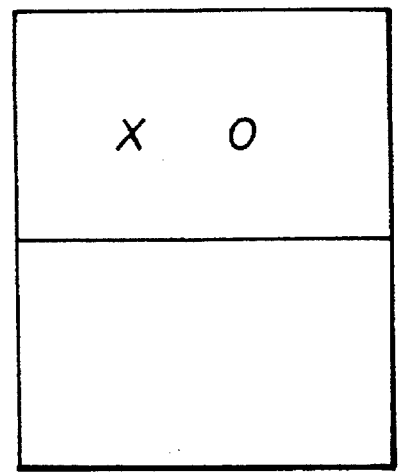
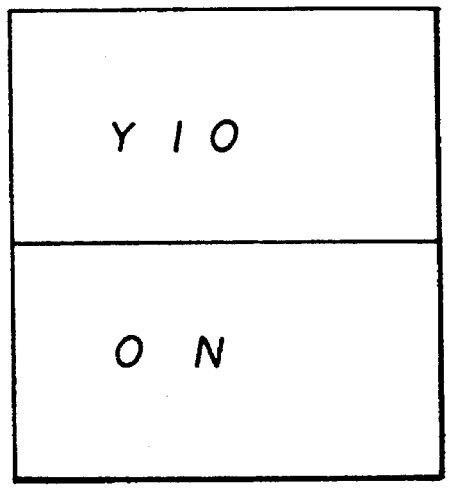
FIG.19(c)
PRIOR ART

PROGRAMMABLE CONTROLLER AND METHOD OF MONITORING A SEQUENCE PROGRAM THEREOF

This is a continuation of application Ser. No. 07/861,021 filed Mar. 31, 1992, abandoned.

FIELD OF THE INVENTION

The present invention relates to a programmable controller and, more particularly, to a method of monitoring a sequence program having index qualification, executed by a CPU unit of the programmable controller, and a method of monitoring such program only at arbitrarily assigned index qualification.

BACKGROUND OF THE INVENTION

Programmable controllers have developed into computer systems that are high in function and high in performance, because of the programmability and flexibility thereof. Generally, the sequence of control operations performed by a programmable controller may be visualized as the electro mechanical equivalent of switch operations, contact closings and coil energizations, However, the processing of the programmable controller may also include various functions such as differentiation, integration, inversion and the like, and address index qualification of a memory or the like, which may be executed by a microprocessor, without being limited to mere contacts and coil analogues. Further, controlling such as analog controlling, positioning processing or the like is also executed. Analog control, positioning control or the like is mainly executed by a special function unit, and sequence control is mainly executed by a CPU unit.

Monitoring of the sequence program in the CPU unit will hereunder be described. Initially, it should be noted that term "sequence scan", as used below, generally indicates that the sequence program is repeatedly executed from the beginning (0 step) to the end (END). Furthermore, the end of the sequence scan generally indicates such a period of time that, after execution of the end (END) of the sequence program, the beginning (0 step) of the sequence program is subsequently executed.

FIG. 16 of the attached drawings illustrates a system arrangement of a conventional programmable controller. As shown in FIG. 16, a CPU unit 1 controls a programmable controller as a whole. A sequence program is stored in a program memory 1a. A device memory 1b is used in the sequence program; also data resulting from performed computations are stored in the device memory 1b. Information related to a monitoring function is stored in a work memory 1d. A program apparatus 2 compiles the sequence program and converts it to a form which is stored in the program memory 1a; it also monitors execution of the sequence program. The CPU unit 1 is connected to the program apparatus 2 through a communication cable 3. The reference numeral 4 denotes an input-output unit, and/or special function unit. The reference numeral 2a denotes a display in the program apparatus 2 for monitoring.

FIG. 17 shows an example of the sequence program. K5 and K8 indicate numerical data 5 and 8, respectively. Moreover, Z0 and Z1 execute a qualification of device numbers of a device such as an input X0, an output Y10 and the like. (a) identifies step numbers of the sequence program, (b) identifies data transfer commands, that is, commands for storing numerical data "5" and "8" into the index registers Z0 and Z1 allocated to the device memory 1b, (c) is a command for computing input information, and (d) is a command for computing output information. Further, operation of the commands (c) and (d) is such that, when X5 (X0Z0=X(0+Z0)=X(0+5)=X5) is turned "ON", Y18(Y10Z1=Y(10+Z1)=Y(10+8)=Y18) is turned "ON".

FIG. 18 illustrates an example of monitoring the sequence programs (c) and (d).

FIGS. 19(a), 19(b) and 19(c) show monitoring function information stored in the work memory 1d of the CPU unit 1, which is transmitted from the CPU unit 1 to the program apparatus 2 through the communication cable 3. Specifically, FIG. 19(a) identifies the categories of relevant monitoring function information in the conventional art. FIG. 19(b) is an example of monitoring function information for the input-information computation command (c) illustrated in FIG. 18. Finally FIG. 19(c) is an example of monitoring function information for the output-information computation command (d).

A specific operation, for example, monitoring of the sequence program, will next be described which consists of an input computation command (contact of relay) and an output computation command (coil of relay) in which an output of the index registers Z0 and Z1 are added to the input device X0 and the output device Y10.

Furthermore, in this example, a case will be described where the device X0 is turned "ON". In this case, the device and number without index qualification are stored from the monitoring function information shown in FIGS. 19(a), 19(b) and 19(c) with respect to the input-information computation command X0Z0(c). That is, with "X0" being the contents of the device, the CPU unit 1 simply stores "ON" as a result of the input computation X0, into the work memory 1d at each of the ends of the sequence scans. Subsequently, the program apparatus 2 interrupts the CPU unit 1 through the communication cable 3 every predetermined or constant cycle, to output a transmission demand of the monitoring function information. The CPU unit 1 transmits the monitoring function information "X0" and "ON" stored in the work memory 1d, to the program apparatus 2 through the communication cable 3, at the end of the sequence scan which receives this demand. After the program apparatus 2 has received the monitoring function information, the program apparatus 2 displays the contents of the monitoring function information on the display 2a, as shown in FIG. 18.

Similarly with respect to the output-information computation command Y10Z1(d), where the device and number are not index-qualified, that is, "Y10" being the contents of the device, the CPU unit 1 stores "ON" as a result of the output computation Y10, into the work memory 1c at each of the ends of the sequence scan. In the program according to this example, if "X0" is "ON", then "Y10" is "ON". Subsequently, the program apparatus 2 interrupts the CPU unit 1 through the communication cable 3 every constant cycle, to output a demand for transmission of the monitoring function information. The CPU unit 1 transmits the monitoring function information "Y10" and "ON" stored in the work memory 1d, to the program apparatus 2 through the communication cable 3, at the end of the sequence scan which receives this demand. After the program apparatus 2 has received the monitoring function information, the program apparatus 2 displays the contents of the monitoring function information on the display 2a as shown in FIG. 18.

FIGS. 20 through 26 are flow charts which schematically describe the above-described operation.

As shown in FIG. 20, the CPU unit 1 executes initial processing (S1) after a power source has been turned on. Subsequently, the sequence program (S2) and END processing (S3) are executed repeatedly. On the side of peripheral equipment, initial processing (S4) is executed after the power source has been turned on. Subsequently, while awaiting key inputting (S5), processings such as monitor processing (S6), screen switching processing (S7) and the like are executed. At this time, an operator opens a screen for monitoring. When monitoring is executed, the peripheral equipment interrupts the CPU unit 1, transmits information to be monitored, and the peripheral equipment is on stand by.

FIG. 21 is the flow chart showing schematic operation of interrupt processing on the side of the CPU unit 1. After a kind of the interruption has been judged (S8), the CPU unit 1 receives a transmission which demands the monitoring function data (S9), for example.

FIG. 22 is the flow chart showing the operation regarding execution of the sequence program on the side of the CPU unit 1 illustrated in FIG. 20. First, the kind of conventional command (e.g., MOV, LD, OUT, etc.) is selected (S10). Then, the selected MOV command processing (S11) which means that the contents of the memory in the CPU unit 1 are transmitted to another memory location, LD command processing (S12) which means that an ON/OFF information of the relay are stored in the memory, OUT command processing (S13) which means that an ON/OFF operation is executed in accordance with the information stored in the memory and the like are executed, and the program proceeds to END command.

FIG. 23 is the flow chart regarding a transmission demand of the monitor data on the side of the CPU unit 1 illustrated in FIG. 21. After a monitor demand flag has been set to presence (S14), a device number to be monitored is saved in the work memory 1c (S15).

FIG. 24 is the flow chart showing operation of END processing on the side of the CPU unit 1 illustrated in FIG. 20. After the main END processing (S3) has been executed (S16), the monitor processing is executed (S17).

Further, FIG. 25 is the flow chart showing the details of the monitor processing illustrated in FIG. 24. First, it is judged that if a flag of the monitor demand is present (S18). In the case where it is judged that the flag of the monitor demand is present, the monitor demand flag is set to absent (S19) and, subsequently, devices to be monitored are read out of the work memory 1c, to save data corresponding respectively to the devices, into the work memory 1c (S20). Subsequently, data to be monitored, are transmitted within the work memory 1c (S21).

FIG. 26 is the flow chart regarding monitor processing on the side of the peripheral equipment illustrated in FIG. 20. First, data indicating the devices and the number to be monitored are saved in the work memory 1c under a condition that the devices and number are not index-qualified (S22). Subsequently, the devices and number to be monitored are transmitted to the side of the CPU unit 1 from the work memory 1c (S23). Subsequently, the condition of receiving waiting (S24) is established. In the case where it is judged that data is being received, monitor data is saved to the work memory 1c (S25). Thus, the monitor data is displayed on the screen from the work memory 1c (S26).

The conventional programmable controller has been constructed as described above. Thus, the monitor contents of the programs (c) and (d) merely display a condition which is not index-qualified, that is, display only the "ON" condition or "OFF" condition of X0 and Y10. No index information is displayed.

Accordingly, in the case where the required devices having index qualification are monitored, not only the screen illustrated in FIG. 18, but also the value of the index qualification, that is, "5" and "8" in this example, must be confirmed. Subsequently, for the index-qualified devices, the display screens of X5 and Y18, must be called up by the operator. For this reason, it is impossible to monitor the devices which have been index-qualified on the same screen on which the program is monitored. Thus, efficient operability is remarkably reduced.

SUMMARY OF THE INVENTION

It is therefore an object of the invention to provide a programmable controller and a method of monitoring a sequence program thereof, in which it is possible to monitor the value of index qualified devices and a condition thereof on the same screen by which a program is monitored, to improve operability so that debugging of the program and maintenance efficiency can be improved.

According to the invention, there is provided a programmable controller comprising a CPU unit and a program apparatus, said programmable controller being operated by a sequence program programmed in said CPU unit, the program apparatus having display means for displaying a program of an arbitrary sequence step in said sequence program, to monitor a device condition of the sequence program displayed during execution of said CPU unit, and the CPU unit having transmission means for transmitting a value corresponding to an arbitrary device having index qualification in said program apparatus and a condition of said arbitrary device during execution of the programmed sequence program to said display means.

According to the invention, there is further provided a method of monitoring a sequence program of a programmable controller, said method comprising the steps of:

providing a program of an arbitrary sequence step in a sequence program programmed in a CPU unit; and monitoring a value corresponding to a device having index qualification and a condition thereof on the same display means.

As described above, according to the invention, the programmable controller comprises the CPU unit and the program apparatus, and is operated by the sequence program which is programmed in the CPU unit. In the programmable controller, the program apparatus displays, on the screen, the program of an arbitrary sequence step in the sequence program programmed in the CPU unit. The programmable controller comprises a monitor which monitors a device condition of the sequence program which is displayed during execution of the CPU unit. The CPU unit comprises a transmission apparatus which transmits the value corresponding to the arbitrary device which is index-qualified and the condition of the device to the program apparatus, during execution of the programmed sequence program. The transmission apparatus can transmit information concerning the device and the condition thereof in accordance with the condition of the index arbitrarily assigned by the operator. With the arrangement, in the arbitrary sequence program displayed on the screen of the program apparatus, it is possible to monitor, on the same screen, the number and the condition of the device after index qualification of the device to which the index qualification is added. Further, it is similarly possible to monitor the number and the condition of the device after having been qualified by the index qualification contents assigned by the operator. As a result, operability can be improved, and debugging of the program and maintenance efficiency can be improved.

In this invention, it is possible to call the program of the arbitrary sequence step, on the screen of the program apparatus, to monitor the device number and the condition thereof after index qualification of the device having the index qualification, on the same screen. Further, the monitoring is arranged such that the operator assigns the arbitrary index condition, and the monitoring is executed only at the time of the assigned index condition.

Other objects and features of this invention will become understood from the following description with reference to the accompanying drawings.

BRIEF DESCRIPTION OF THE DRAWINGS

FIGS. 4(a), 4(b) and 4(c) are views for explanation showing an example of monitoring function information transmitted between a CPU unit and a program apparatus, according to the invention;

FIGS. 11(a), 11(b) and 11(c) are views for explanation showing a second embodiment of monitoring function information transmitted between the CPU unit and the program apparatus, according to the invention;

FIGS. 19(a), 19(b) and 19(c) are views for explanation showing a conventional example of monitoring function information transmitted between a CPU unit and a program apparatus;

DESCRIPTION OF THE EMBODIMENTS

Figure 1:
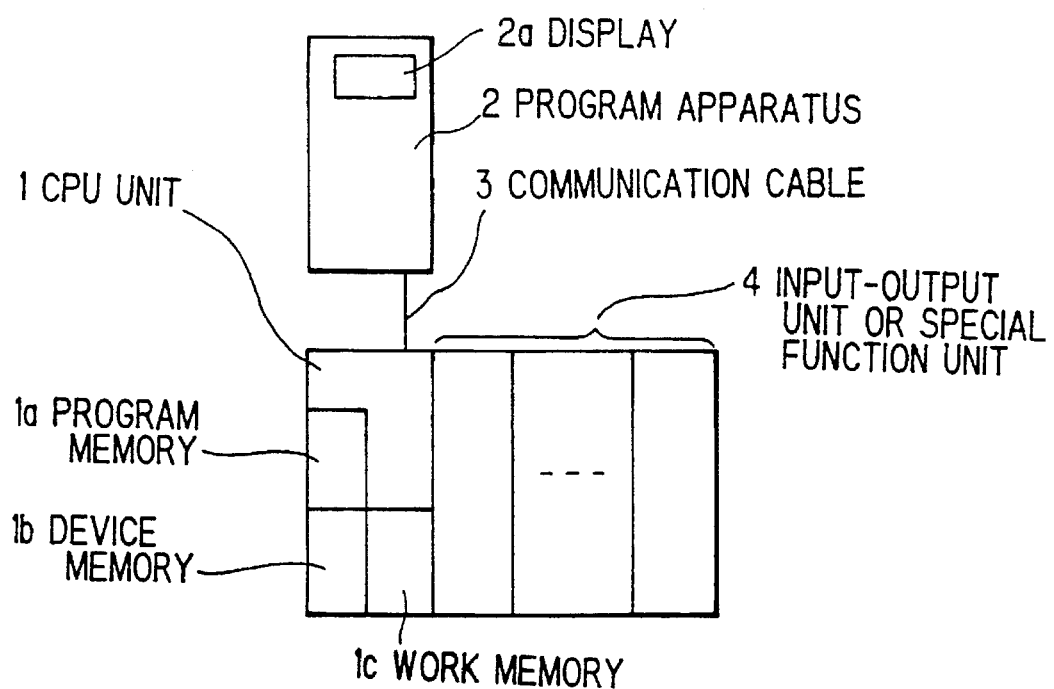
FIG. 1 is a view for explanation showing a schematic arrangement of a programmable controller according to the invention.

Referring first to FIG. 1, there is shown a CPU unit 1 which controls a programmable controller as a whole. A sequence program is stored in a program memory 1a. A device memory 1b is used in the sequence program; also data resulting from performed computations are stored in the device memory 1b. Information related to a monitoring function is stored in a work memory 1c. A program apparatus 2 compiles the sequence program and converts it to a form which is stored in the program memory 1a; it also monitors execution of the sequence program. The CPU unit 1 and the program apparatus 2 are connected to each other through a communication cable 3. The reference numeral 4 denotes input-output units, and/or special function units. The reference numeral 2a denotes a display in program apparatus 2 for monitoring.

Figure 2:
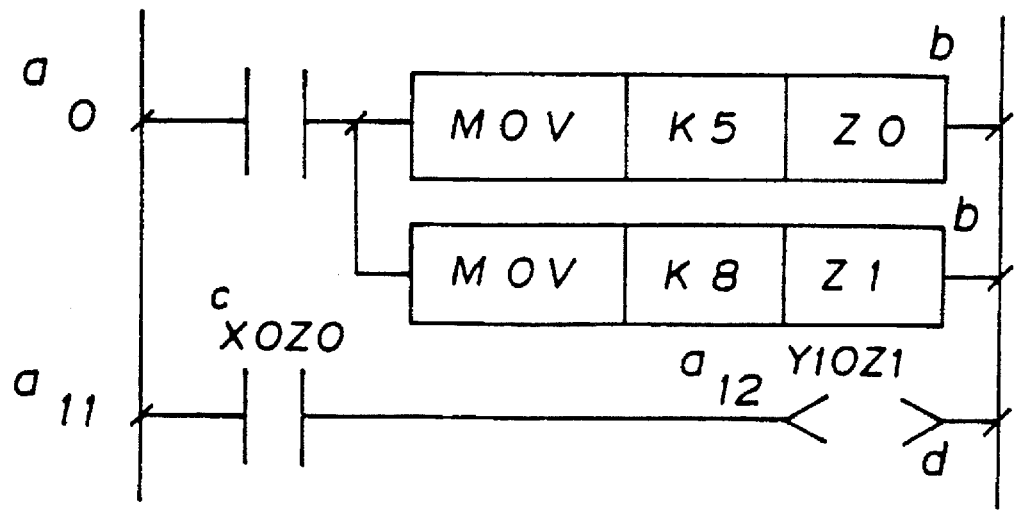
FIG. 2 is a view for explanation showing an example of a sequence program, according to the invention.

FIG. 2 shows a step number of the sequence program. (b) indicates data transmission commands, that is, commands for storing numerical data "5" and "8" to index resisters Z0 and Z1 which are allocated to the device memory 1b. (c) indicates a command for computing input information. (d) indicates a command for computing output information.

Figure 3:
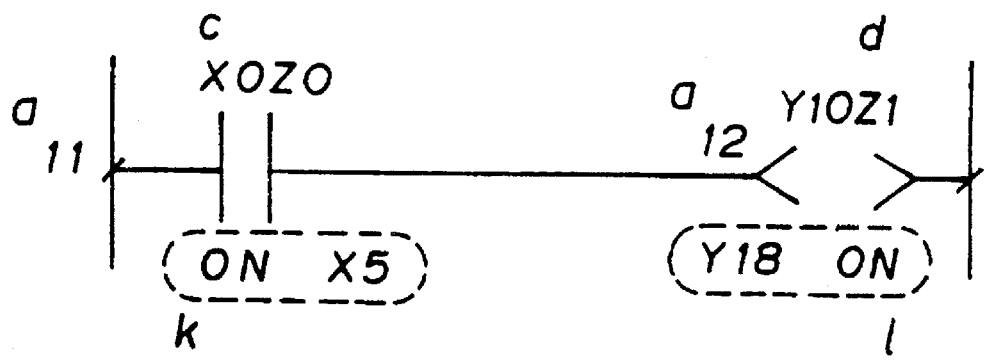
FIG. 3 is a view for explanation showing a monitor example of the sequence program, according to the invention.

FIG. 3 is a monitor example of the sequence programs (c) and (d).

FIGS. 4(a), 4(b) and 4(c) illustrate monitoring function information which is transmitted from the CPU unit 1 to the program apparatus 2 through the communication cable 3 and which is stored in the work memory 1c of the CPU unit 1. Specifically, FIG. 4(a) identifies the categories of relevant monitoring function information. FIG. 4(b) shows an example of the monitoring function information of the input-information computation command (c) illustrated in FIG. 3. FIG. 4(c) shows an example of the monitoring function information of the output-information computation command (d) illustrated in FIG. 3. Furthermore, (k) and (1) illustrated in FIG. 3 show the corresponding monitor display on a screen thereof.

The monitoring of the sequence program consisting of an input-computation command (contact of relay) and an output-computation command (coil of relay), in which the index registers Z0 and Z1 are added respectively to an input device X0 and an output device Y10, will next be considered.

In this case, data in accordance with the description of the monitored information illustrated in FIG. 4(a) are stored in the work memory 1c as shown in FIG. 4(b). That is "11" as a sequence step number required to be monitored, "X0" as a device and number before index qualification, and "Z0" as an index and number are stored in the work memory 1c of the CPU unit 1 through the communication cable 3 from the program apparatus 2. The above identified data is initial data taken at a point in time when monitoring of a particular screen starts.

As the sequence program is executed, the contents "5" of the index Z0 immediately after execution of the command of the sequence step number "11" which is required to be monitored is stored in work memory 1C. Also, the contents "ON" of the specified device after index qualification, that is, the contents of "X5", are stored in the work memory 1c. Hereinafter, the contents of the work memory 1c are updated immediately after every execution of the sequence step "11" required to be monitored.

Subsequently, the program apparatus 2 interrupts the CPU unit 1 through the communication cable 3 at predetermined times or every fixed cycle, to output a transmission demand of the monitoring function information. In response, CPU unit 1 transmits the monitoring function information "11", "X0", "Z0", "5" and "ON" stored in the work memory 1c, through the communication cable 3, at the end of the sequence scan during which this demand was received.

After having received the monitoring function information, the program apparatus 2 uses the information to compute the device and number "X0+Z0" →"X0+5"→"X5" after index qualification. Subsequently, the computed "X5" and "ON" of the ON/OFF condition are displayed on the screen.

The output computation command Y10Z1 will similarly be described in accordance with the monitoring function information. That is, a sequence step number "12" required to be monitored and the device and number "Y10" before index qualification as well as the index and number "Z1" are stored in the work memory 1c of the CPU unit 1 from the program apparatus 2 through the communication cable 3 as initial data.

Subsequently, during execution of the sequence program, immediately after execution of the command of the sequence step "12" required to be monitored, the contents of the index "Z1" and "8" and the contents "ON" after index qualification, that is, the contents of "Y18" are stored in the work memory 1c. Hereinafter, the contents of the work memory 1c are updated immediately after each execution of the sequence step "12" specified to be monitored. Subsequently, the program apparatus 2 interrupts the CPU unit 1 through the communication cable 3 on a predetermined basis, e.g. every fixed cycle, to put forward a transmission demand for the monitoring function information.

The CPU unit 1 transmits the monitoring function information "12", "Y10", "Z1", "8" and "ON" stored in the work memory 1c, to the program apparatus 2 through the communication cable 3, at the end of the sequence scan during which this demand was received. After the program apparatus 2 has received the monitoring function information, the program apparatus 2 computes the device and number "Y18" after index qualification, from the monitoring function information, and displays the device and number "18" together with "ON" of the ON/OFF condition (refer to (1) in FIG. 4(d)).

Figure 5:
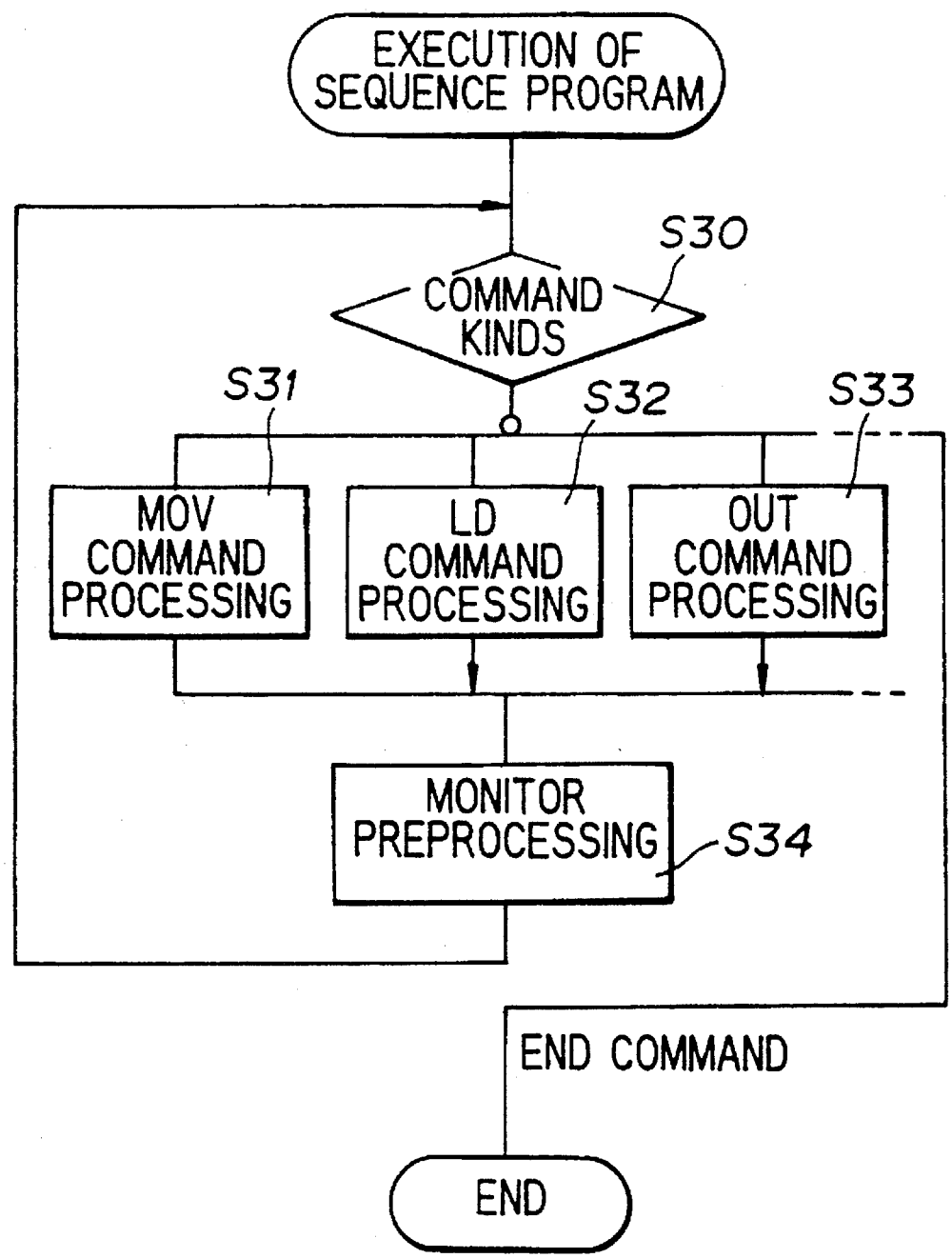
FIG. 5 is a flow chart showing operation regarding execution of the sequence program, according to the invention.
Figure 20:
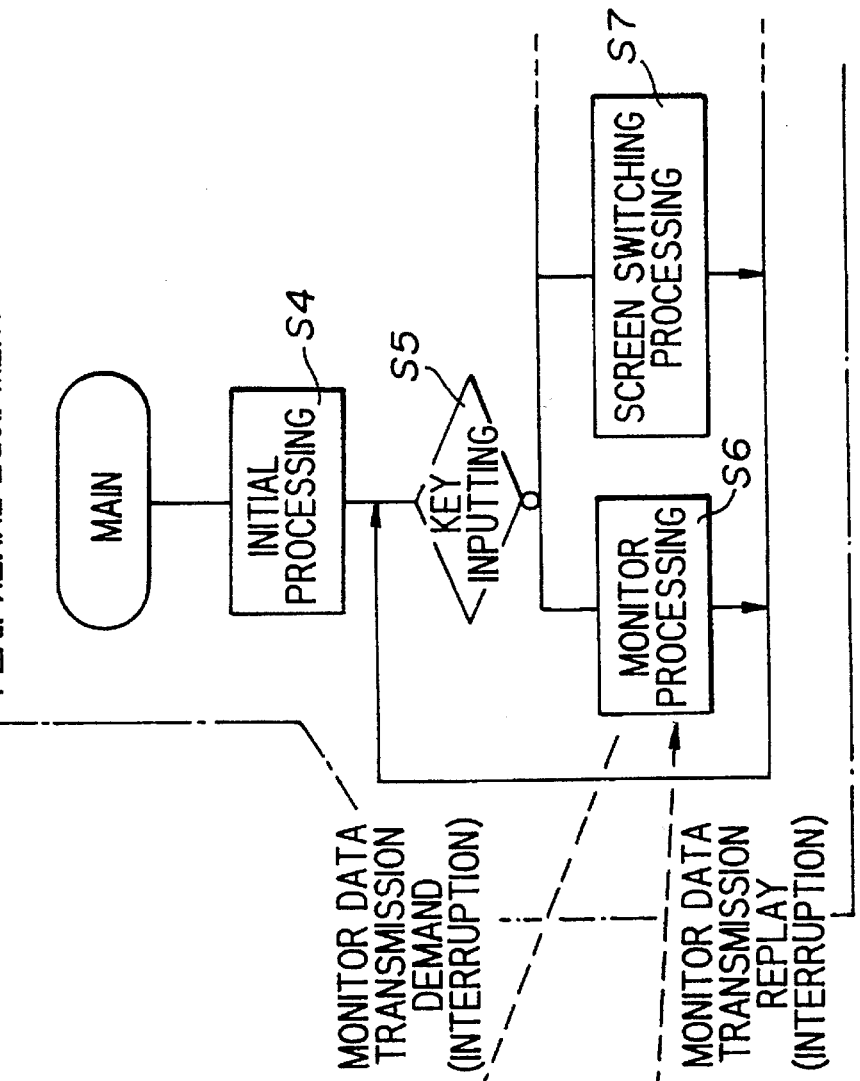
FIG. 20 is a flow chart showing main operation on the side of the CPU unit and on the side of peripheral equipment.
Figure 21:
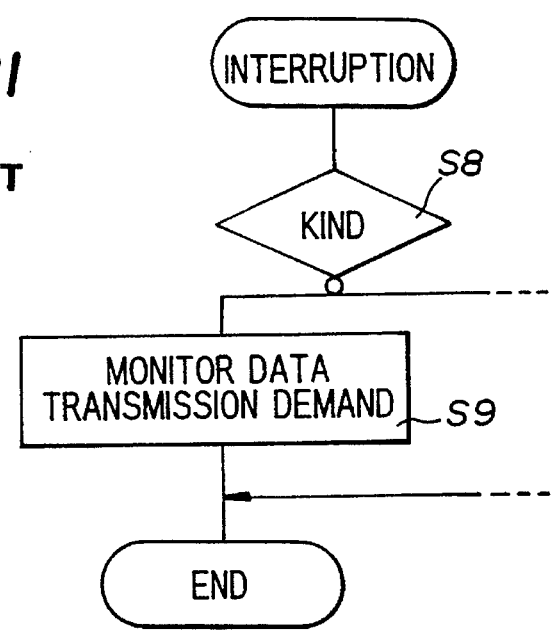
FIG. 21 is a flow chart showing interrupt operation illustrated in FIG. 15.
Figure 22:
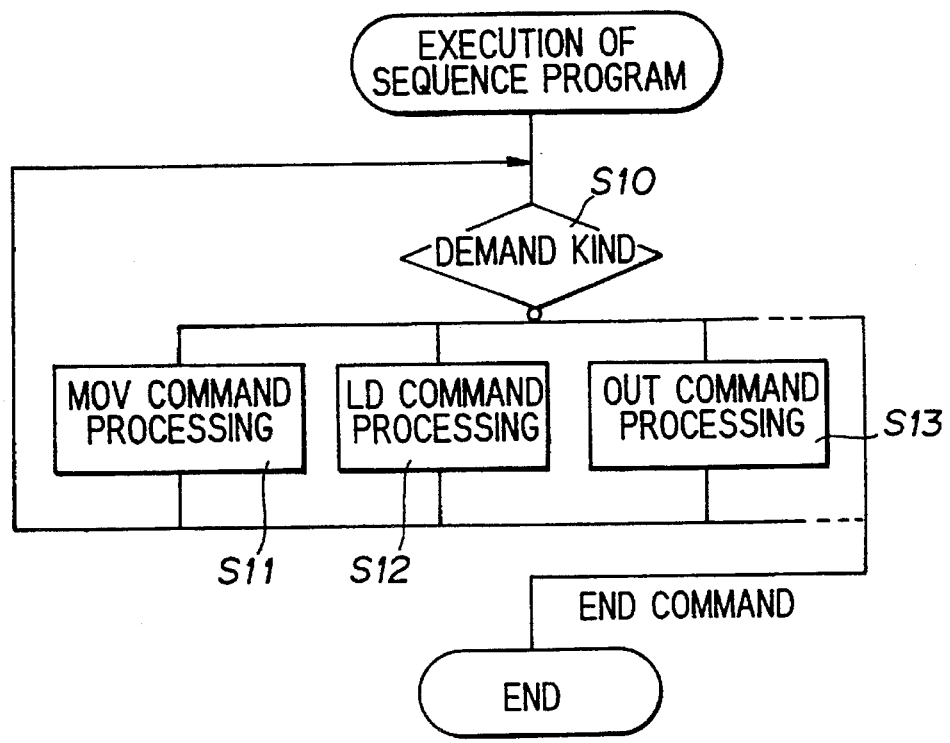
FIG. 22 is a flow chart showing operation regarding execution of the conventional sequence program.
Figure 23:
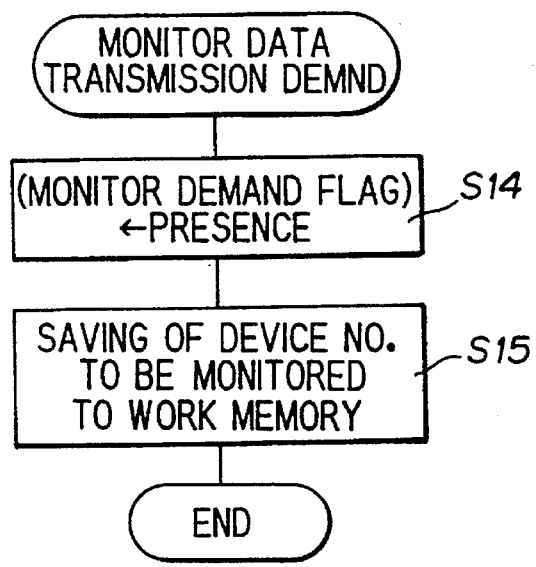
FIG. 23 is a flow chart showing operation regarding a conventional transmission demand of monitor data.
Figure 24:
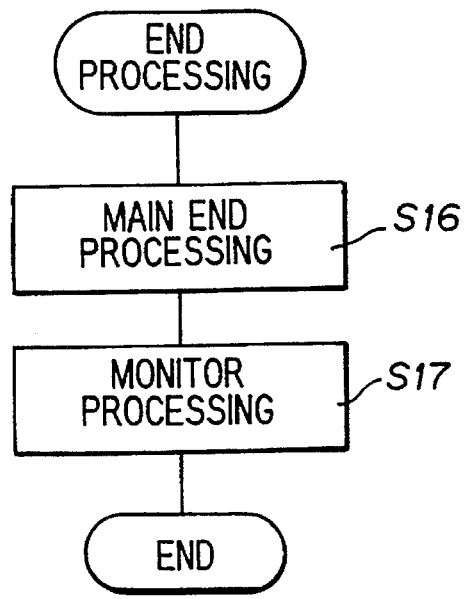
FIG. 24 is a flow chart showing operation regarding conventional END processing.
Figure 25:
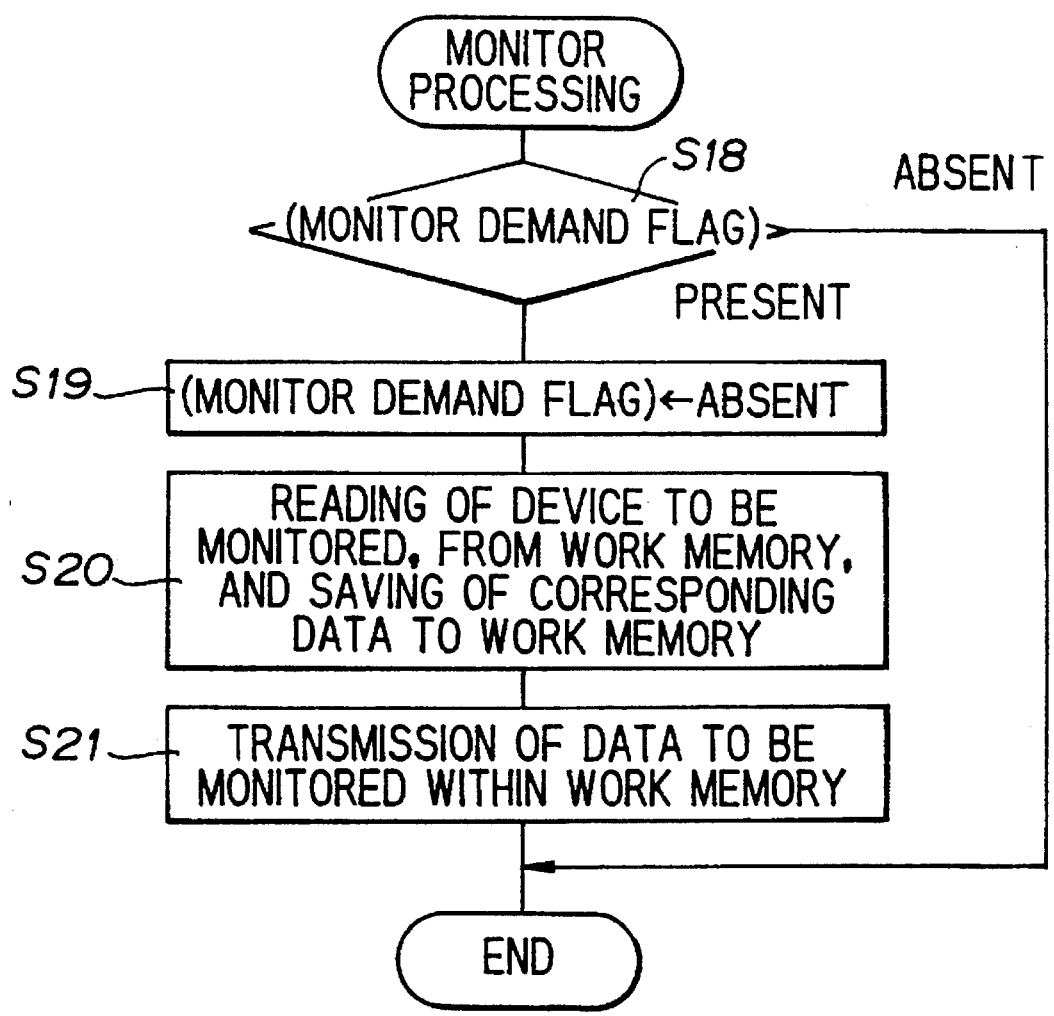
FIG. 25 is a flow chart showing operation regarding monitor processing within END processing illustrated in FIG. 19.
Figure 26:
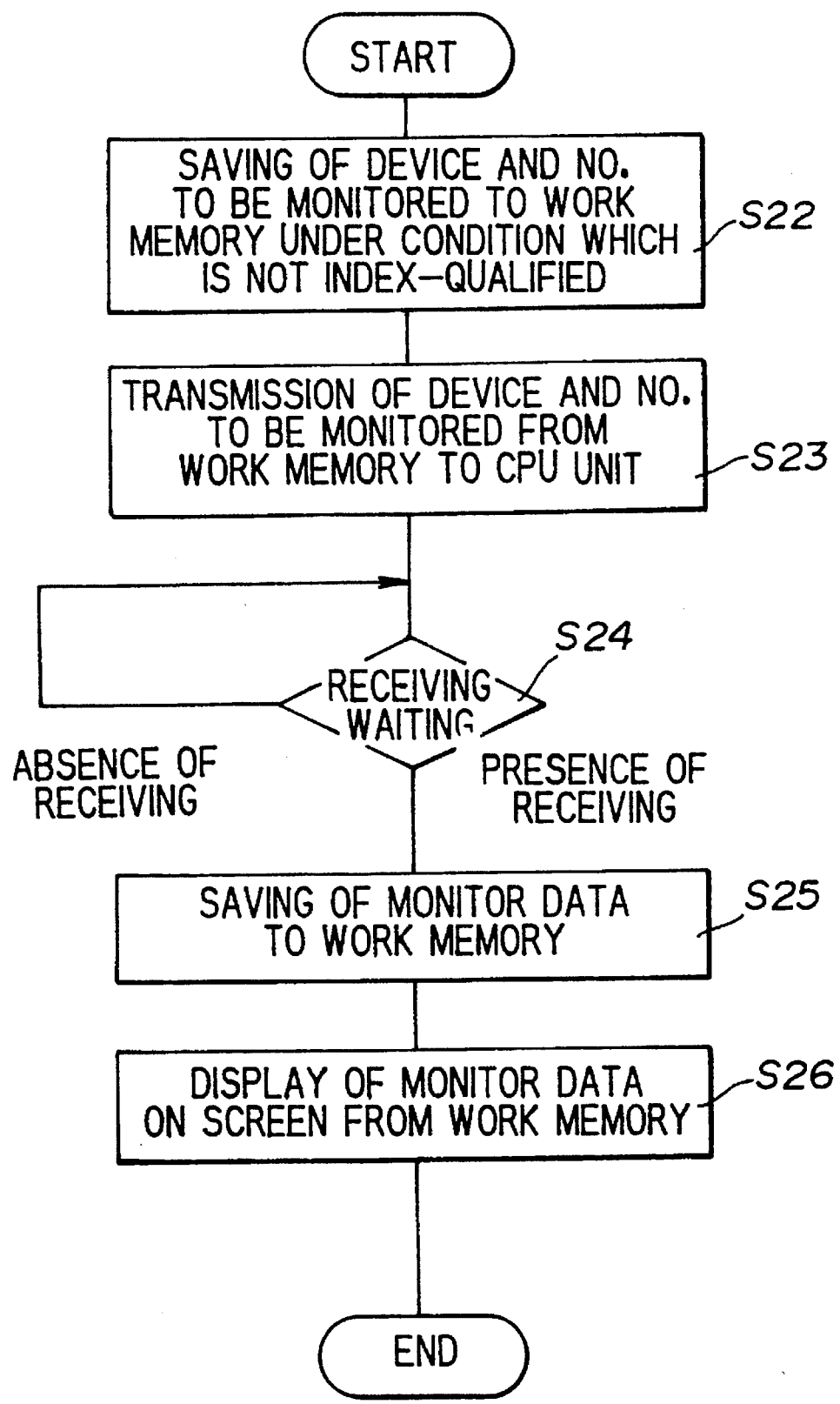
FIG. 26 is a flow chart showing operation regarding the conventional monitor processing on the side of the peripheral equipment.

FIGS. 5 through 9 are flow charts which schematically describe the above-mentioned operation. Further, the simulated operation of the CPU unit and the peripheral equipment is the same as that illustrated in FIG. 20. FIG. 5 is the flow chart showing the operation regarding execution of the sequence program on the side of the CPU unit 1. First, the type of conventional command (e.g., MOV, LD, OUT) is selected (S30). Then MOV command processing (S31), LD command processing (S32), OUT command processing (S33) and the like are executed. Subsequently, the program proceeds to monitor preprocessing (S34).

Figure 6:
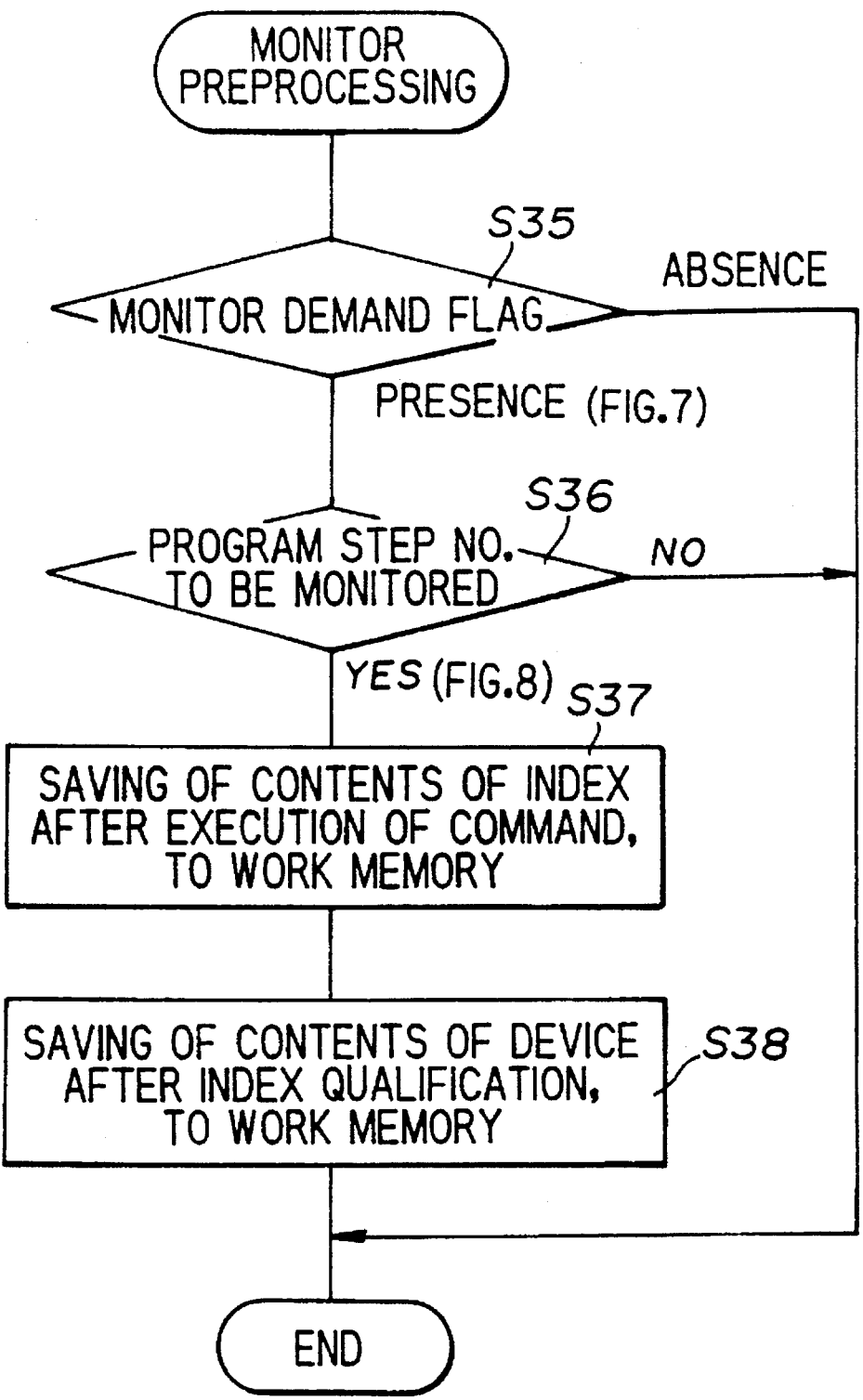
FIG. 6 is a flow chart showing operation regarding monitor preprocessing, according to the invention.

FIG. 6 is the flow chart showing operation of the monitor preprocessing illustrated in FIG. 5. First, it is judged whether there is a monitor demand flag (S35). In the case where there is the monitor demand flag, it is subsequently judged whether or not the current program command is the program step number to be monitored (S36) as identified in FIG. 12. In the case where it is judged that the program is the program step number to be monitored, the contents of the index after execution of the command are saved in the work memory 1c (S37), and the contents of the device after index qualification are saved in the work memory 1c. When there is no monitor demand flag present (S35) or the current program command is not the program step number to be monitored (S36), the monitor processing is terminated.

Figure 7:
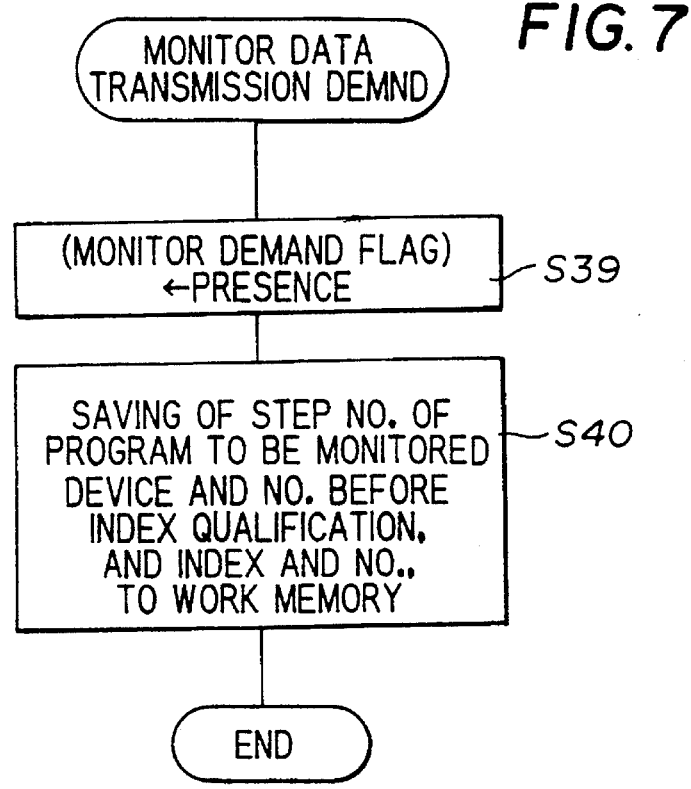
FIG. 7 is a flow chart showing operation regarding a transmission demand of monitoring function information, according to the invention.

FIG. 7 is a flow chart regarding the demand for transmission of the monitoring data on the side of the CPU unit 1. After the monitor demand flag has been set (i.e., is present) (S39), the step number of the program to be monitored, the device and number before index qualification, and the index and number are saved in the work memory on each cycle (S40).

Figure 8:
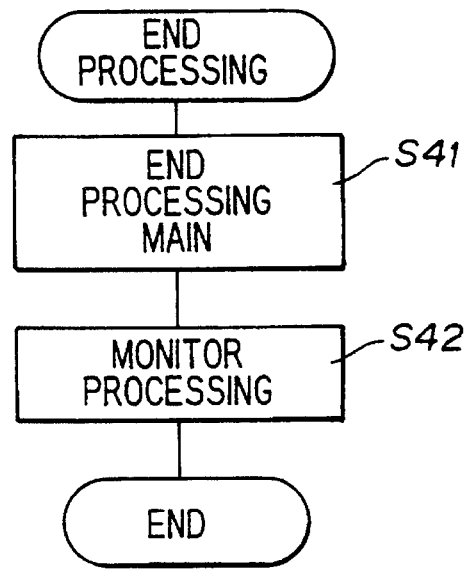
FIG. 8 is a flow chart showing operation regarding END processing, according to the invention.
Figure 9:
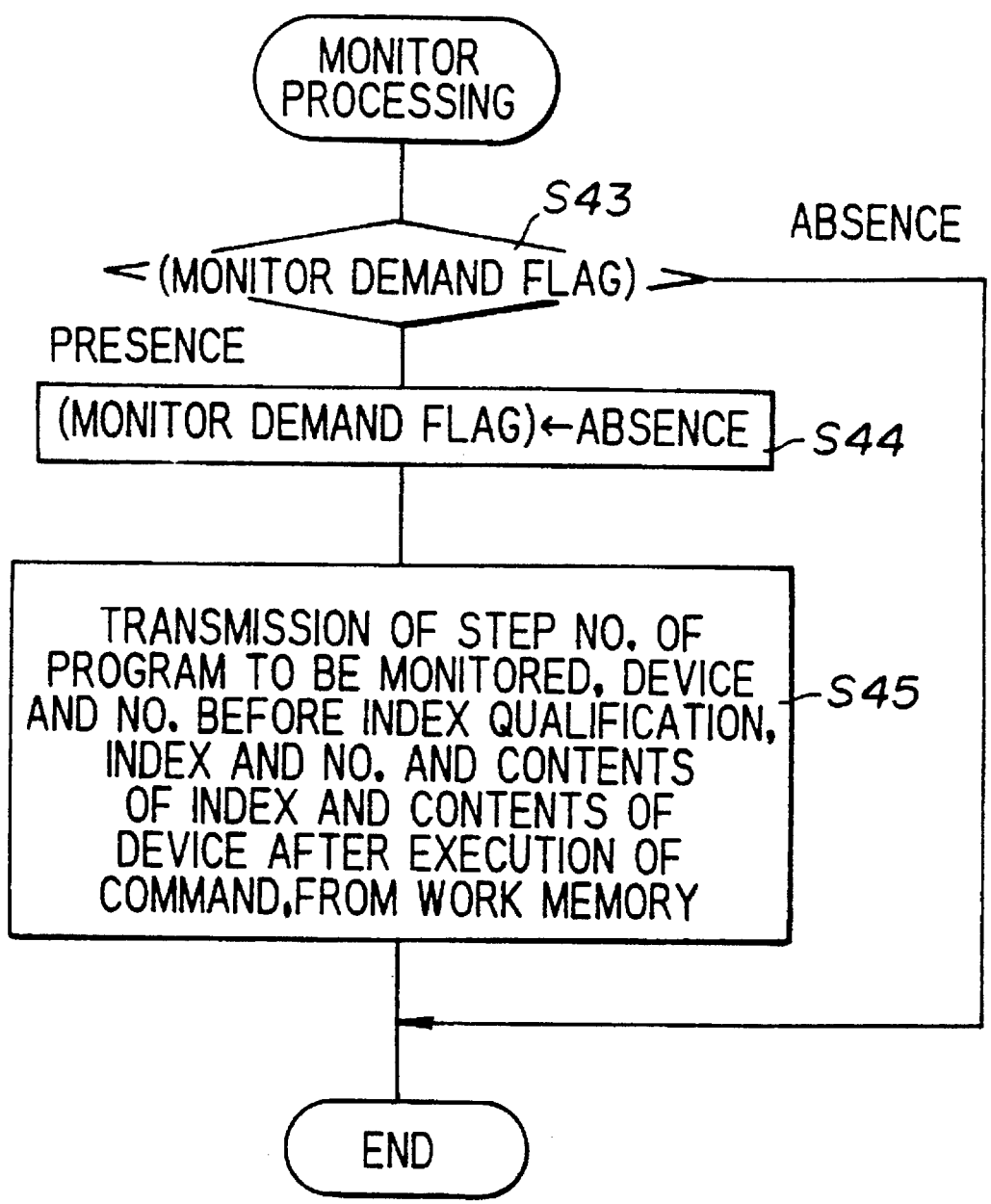
FIG. 9 is a flow chart showing operation regarding monitor processing within the END processing illustrated in FIG. 8.

FIG. 8 is the flow chart showing operation of the END command processing on the side of the CPU unit 1 illustrated in FIG. 5. After the main END processing has been executed (S41), monitor processing (S42) is executed. Further, FIG. 9 is the flow chart showing the details of the monitor processing illustrated in FIG. 8. First, presence or absence of the monitor demand flag is judged (S43). In the case where there is a flag signifying a monitor demand, first, the monitor demand flag is judged to signify the absence of a monitor demand, since monitoring will be presently executed (S44). Then, the step number of the program to be monitored, the device and number before index qualification, the index and number, and the contents of the index and the contents of the device after execution of the command are transmitted from the work memory 1c (S45). Of course, if there is no monitor demand flag, monitor processing is terminated.

Figure 10:
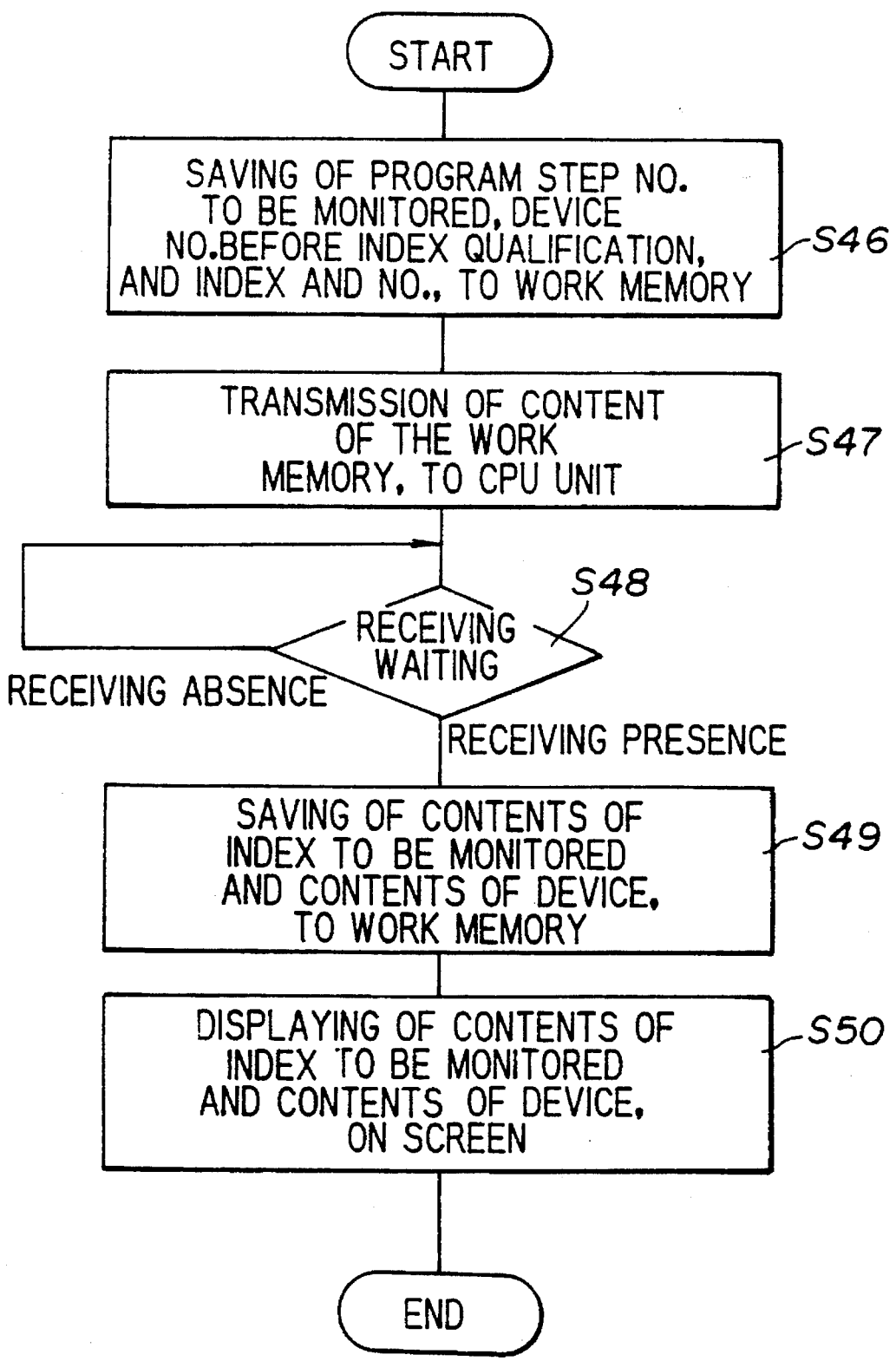
FIG. 10 is a flow chart showing operation regarding monitor processing on the side of peripheral equipment, according to the invention.

FIG. 10 is a flow chart regarding the monitor processing on the side of the peripheral equipment. First, the program step number to be monitored, the device and number before index qualification, and the index and number are saved in the work memory 1c (S46). Then, the aforesaid contents of the work memory 1c are transmitted to the CPU unit 1 (S47). Subsequently, a condition of the monitor processing on the side of the peripheral equipment is brought to a receiving waiting condition (S48). In the case where there is data received, the contents of the index to be monitored and the contents of the device are saved in the work memory 1c (S49). The contents of the index to be monitored and the contents of the device are displayed on the display 2a from the work memory 1c (S50).

A second embodiment of the invention will next be described. FIGS. 1 through 3 are common also to the present embodiment, and the duplicate description will be omitted. FIGS. 11(a), 11(b) and 11(c) are monitoring function information which is transmitted from the CPU unit 1 to the program apparatus 2 through the communication cable 3 and which is stored in the work memory 1c of the CPU unit 1. Specifically, FIG. 11(a) is the description of the contents of the monitoring function information, FIG. 11(b) is an example of the monitoring function information of the input-information computation command (c) illustrated in FIG. 3, and FIG. 11(c) is an example of the monitoring function information of the output-information computation command (d) illustrated in FIG. 3. Further, (k) and (1) shown in FIG. 3 indicate the corresponding monitor display on the screen 2a.

Specific operation, for example, monitor of the sequence program consisting of the input computation command (contact of relay) and the output computation command (coil of relay) in which the index registers Z0 and Z1 are added to the input device X0 and the output device Y10 will next be considered.

In this case, data in accordance with the description of the contents of the monitoring function information illustrated in FIG. 11(a) are stored in the work memory 1c as shown in FIG. 11(b). That is, "11" monitored, and the device and number "X0+Z0"→"X0+5"→"X5" after index qualification assigned by the operator are computed. At the time the monitoring of the information required to be monitored starts, "11" and the device and number "X0+Z0"→"X0+ 5"→"X5" are stored in the work memory 1c of the CPU unit 1 from the program apparatus 2 through the communication cable 3. These stored values will be referenced to control the monitoring function.

During execution of the sequence program, immediately after the execution of the command at the sequence step number "11" which work memory 1c identified as required to be monitored, the contents "ON" of "X5" qualified by the contents "5" of the index Z0 are stored in the work memory 1c. Thereafter, the contents of the work memory 1c are updated at every execution of the sequence step "11" which is identified as required to be monitored.

Subsequently, the program apparatus 2 interrupts the CPU unit 1 through the communication cable 3 at predetermined times, e.g., every cycle, to output a transmission demand for the monitoring function information. The CPU unit 1 transmits the monitoring function information "11", "X5" and "ON" stored in the work memory 1c, to the program apparatus 2 through the communication cable 3, at the end of the sequence scan during which the aforementioned demand was received.

The program apparatus 2 receives the abovedescribed demand and, subsequently, displays on the display 2a the device and number "X5" after index qualification, and "ON" of the ON/OFF condition, from the monitoring function information (refer to (k) in FIG. 3).

The output computation command Y10Z1(d) will similarly be described in accordance with the monitoring function information illustrated in FIG. 4(c). That is, the sequence step number "12" required to be monitored, the device and number "Y18" after index qualification assigned by the operator are computed, and are stored in the work memory 1c of the CPU unit 1 from the program apparatus 2 through the communication cable 3.

During execution of the sequence program, immediately after the command of the sequence step "12" required to be monitored has been executed, the contents of the index "Z1" and the contents "ON" of "Y18" qualified by "8" are stored in the work memory 1c. Then, the contents of the work memory 1c are updated immediately at every subsequent execution of the sequence step "12", required to be monitored. Subsequently, the program apparatus 2 interrupts the CPU unit 1 through the communication cable 3 every at predetermined times, e.g., cycle, to put forward a transmission demand of the monitoring function information.

At the end of the sequence scan during which this demand is received, the CPU unit 1 transmits the monitoring function information "12", "Y18" and "ON" stored in the work memory 1c, to the program apparatus 2 through the communication cable 3. The program apparatus 2 receives the monitoring function information and, subsequently, displays the device and number "Y18" after index qualification, together with "ON" of the ON/OFF condition, from the monitoring function information (refer to (1) in FIG. 3).

Figure 12:
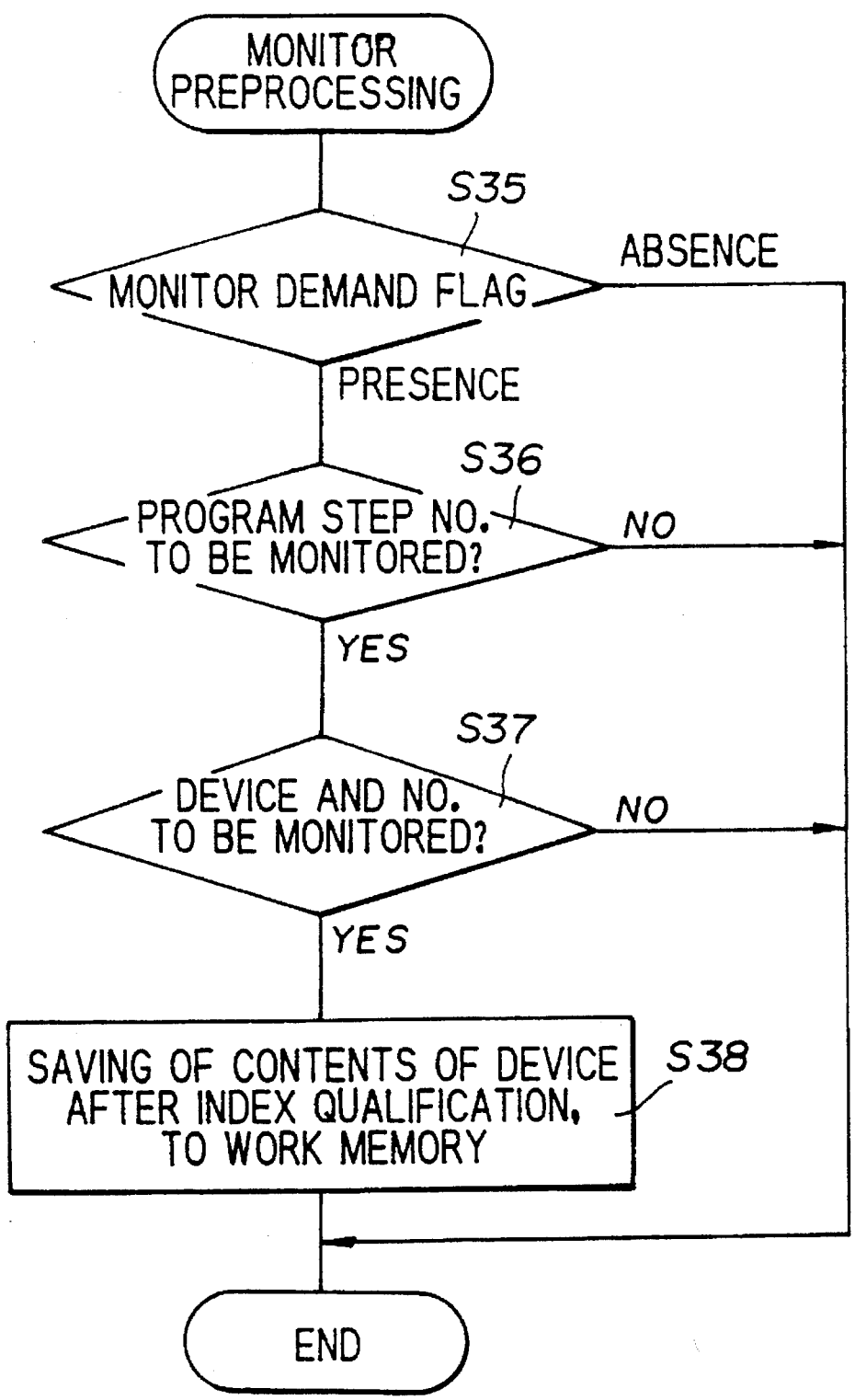
FIG. 12 is a flow chart showing operation of the second embodiment regarding monitor preprocessing, according to the invention.

FIGS. 5 and 8 are common also to the present embodiment, and the duplicate description will be omitted. FIGS. 12 through 15 are flow charts which schematically describe the above-described operation. Further, simulated operation of the CPU unit and the peripheral equipment is the same as that illustrated in FIG. 20. FIG. 12 is the flow chart showing operation of the monitor preprocessing illustrated in FIG. 5. First, the presence or absence of the monitor demand flag is judged (S35). In the case where there exists the monitor demand flag, it is subsequently judged whether or not the program is the program step number to be monitored (S36). As a result, in the case where it is judged that the program is the program step number to be monitored, it is judged whether or not the program is the device and number to be monitored (S37). As a result, in the case where it is judged that the program is the device and number to be monitored, the contents of the device after index qualification are saved in the work memory 1c (S38).

Figure 13:
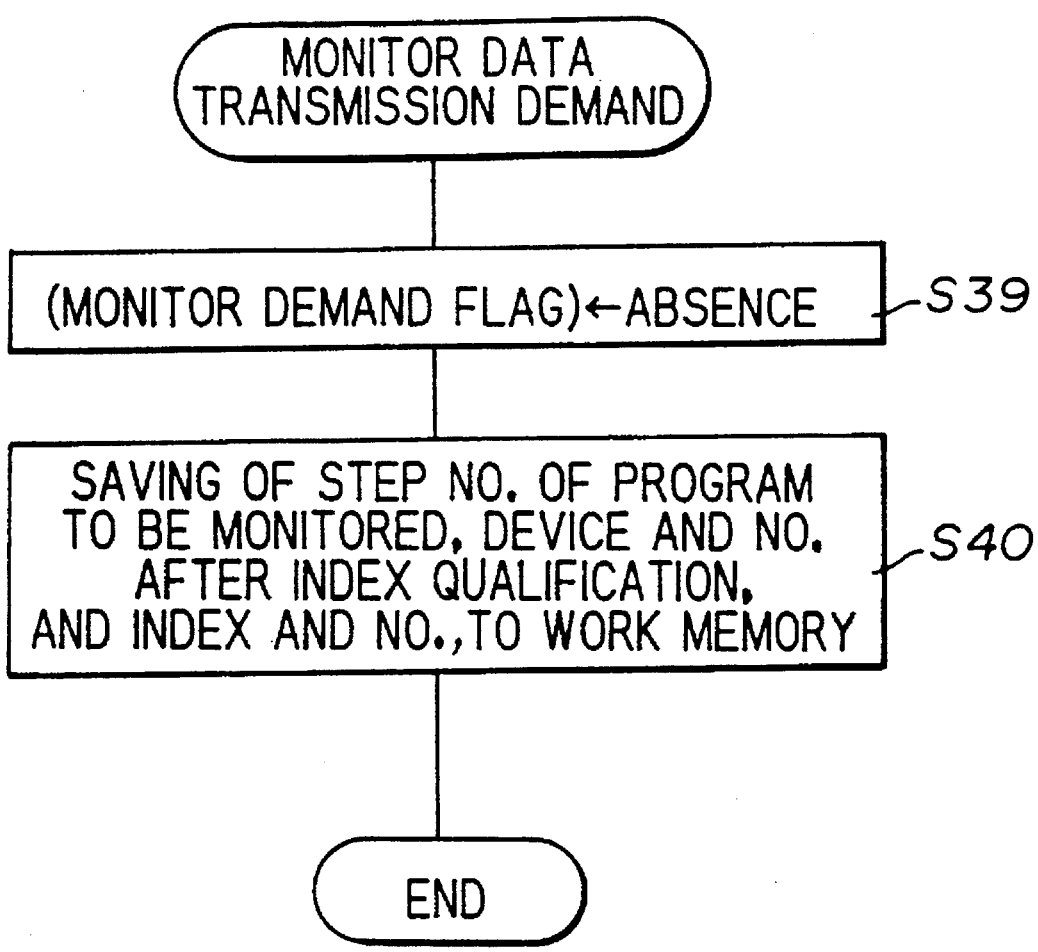
FIG. 13 is a flow chart showing operation of the second embodiment regarding a transmission demand of monitor data, according to the invention.

FIG. 13 is the flow chart regarding a monitor-data transmission demand on the side of the CPU unit 1. After the monitor demand flag is set (S39), the step number of the program to be monitored, the device and number after index qualification, and the index and number are saved to the work memory 1c (S40).

Figure 14:
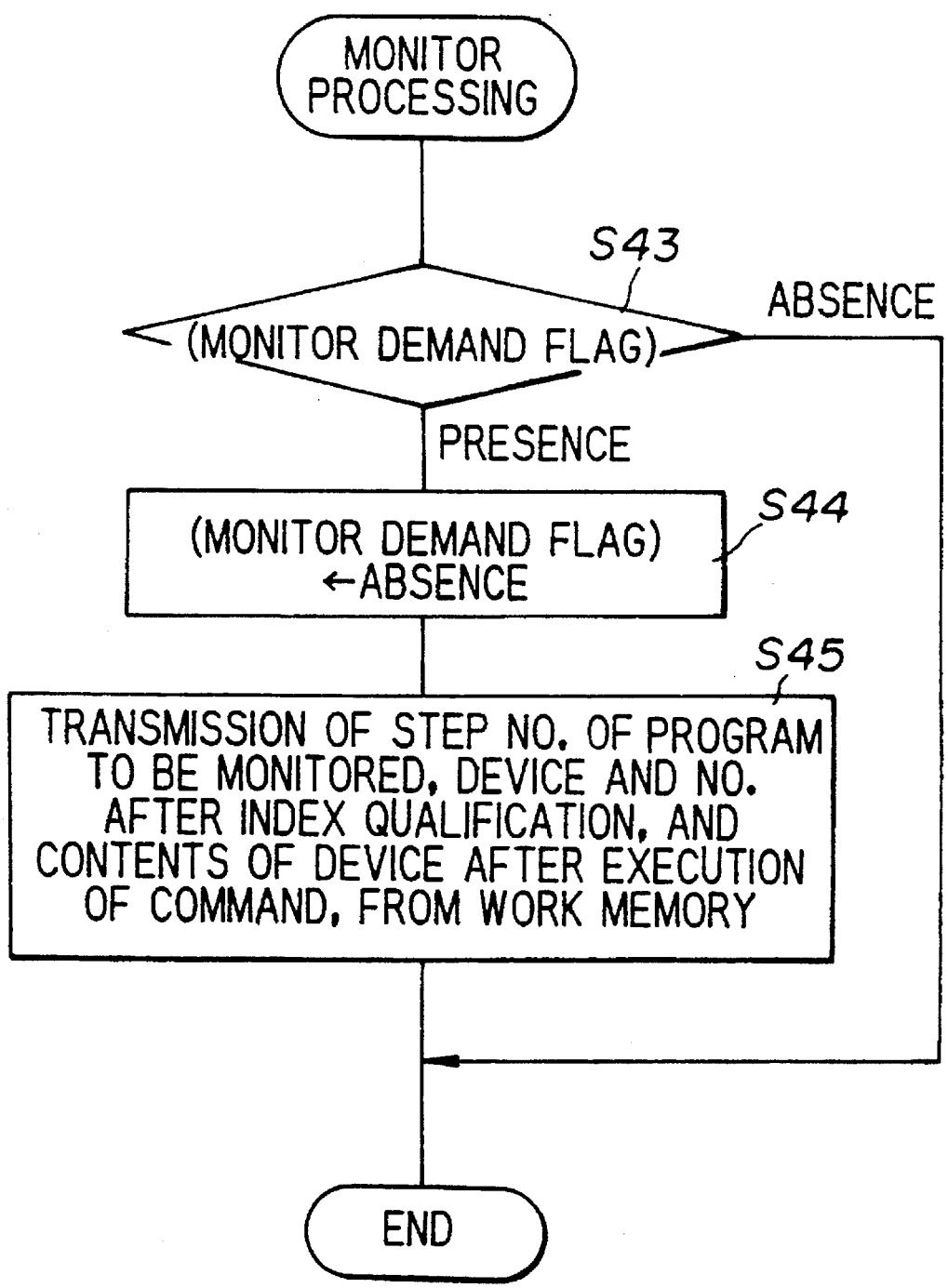
FIG. 14 is a flow chart showing operation of the second embodiment regarding the monitor processing in the END processing illustrated in FIG. 8.

FIG. 14 is the flow chart showing the details of the monitor processing illustrated in FIG. 8. First, the absence or presence of the flag of the monitor demand is judged (S43). In the case where there is a monitor demand flag, the monitor demand flag is set to absence (S44) and, subsequently, the step number of the program to be monitored, the device and number after index qualification, and the contents of the device after execution of the command are transmitted from the work memory 1c (S45).

Figure 15:
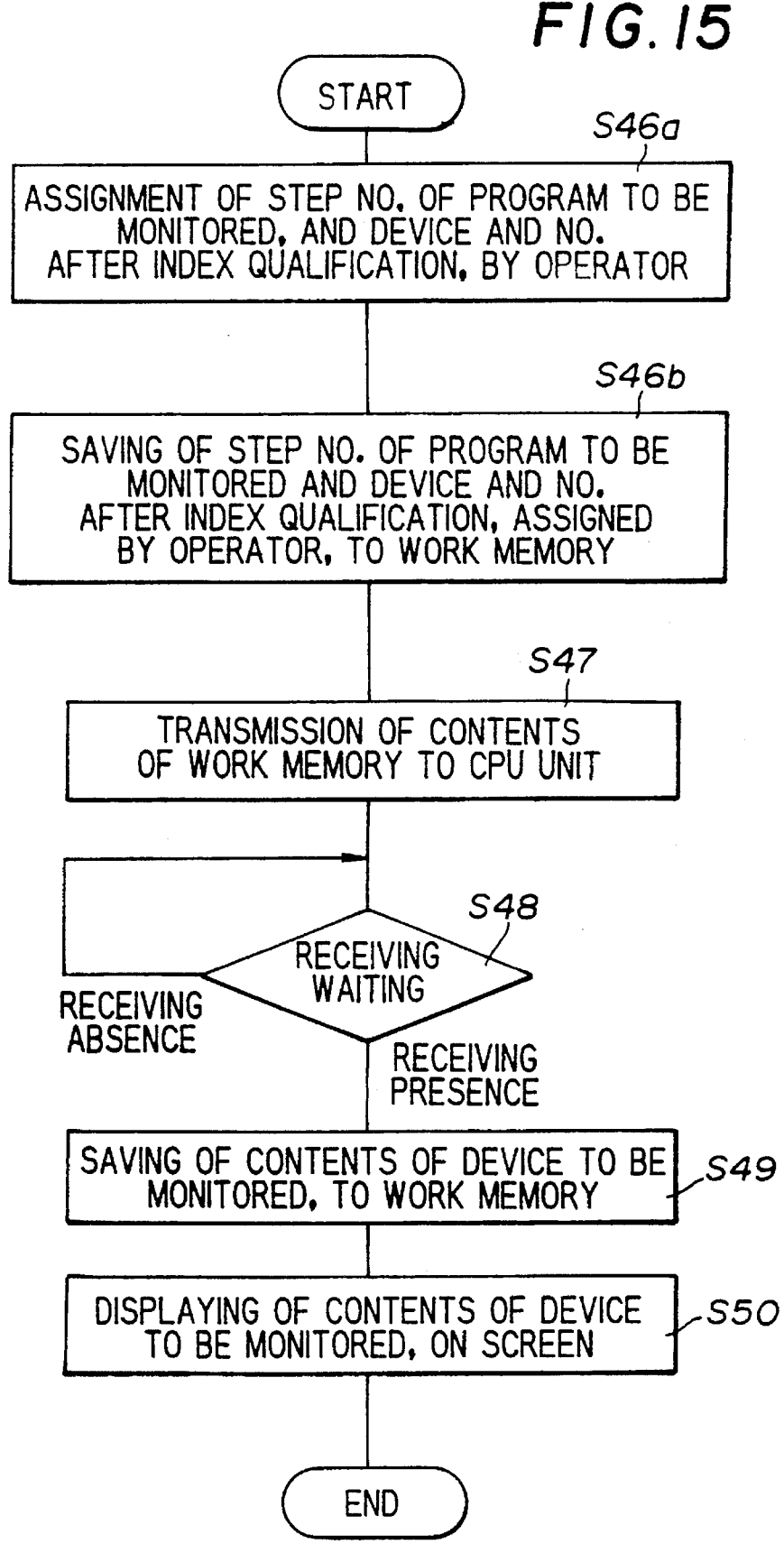
FIG. 15 is a flow chart showing operation of the second embodiment regarding the monitor processing on the side of the peripheral equipment, according to the invention.
Figure 16:
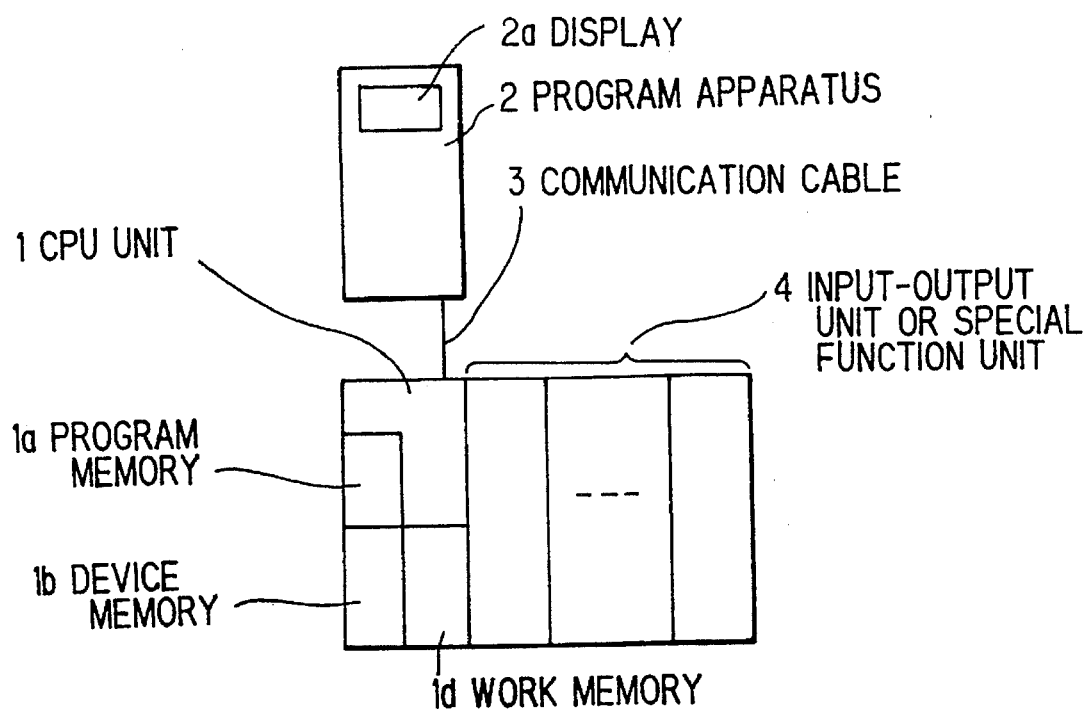
FIG. 16 is a view for explanation showing a schematic arrangement of a conventional programmable controller.
Figure 17:
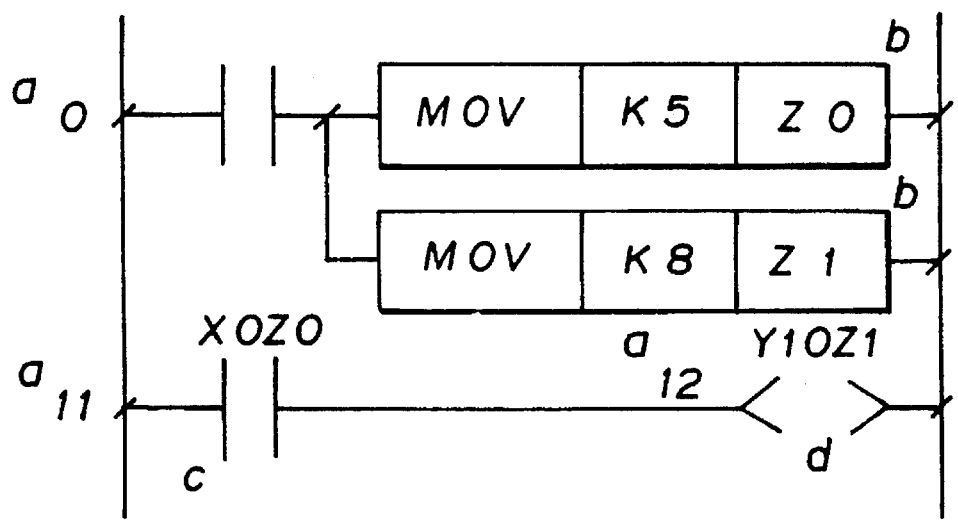
FIG. 17 is a view for explanation showing an example of a conventional sequence program.
Figure 18:
FIG. 18 is a view for explanation showing a monitor example of the conventional sequence program.

FIG. 15 is the flow chart regarding the monitor processing on the side of the peripheral equipment. First, the program step number to be monitored, and the device and number after index qualification are assigned by the operator (S46a). The program step number to be monitored, assigned by the operator, and the device and number after index qualification are next saved to the work memory 1c (S46b). Furthermore, the aforesaid contents of the work memory 1c are transmitted to the CPU unit 1 (S47). Subsequently, a condition is brought to a receiving waiting condition (S48). In the case where there is receiving, the contents of the index to be monitored and the contents of the device are saved to the work memory 1c (S49), to display the content of the index to be monitored and the contents of the device on the screen from the work memory 1c (S50).

In connection with the above, the embodiments have been described such that the CPU unit 1 and the program apparatus 2 are connected to each other through the communication cable 3. However, the CPU unit 1 and the program apparatus 2 may directly be connected to each other. Further, in the above-described embodiments, the input information is X, and the output information is Y. However, the information may be "ON" and "OFF" information of a device which executes bit dealing or handling equivalent to a relay in the interior, or may be the contents of a device equivalent to a data register, that is, numerical data or character data.

Although the invention has been described with respect to specific embodiments for a complete and clear disclosure, the appended claims are not to be thus limited but are to be construed as embodying all modifications and alternative constructions that may occur to one skilled in the art which fairly fall within the basic teaching herein set forth.

What is claimed is:

1. A programmable controller comprising a CPU unit, a work memory coupled to said CPU unit, a program memory coupled to said CPU unit and program apparatus means, said programmable controller being operated by a sequence program stored in said program memory and executable in a sequence of steps by said CPU unit and controlling the condition of a plurality of devices, said program apparatus means monitoring a device condition during execution of said sequence program by said CPU unit and comprising display means for displaying an arbitrary sequence step in said sequence program, and said CPU unit comprising transmission means for transmitting to said display means information concerning an arbitrary device having index qualification for a subroutine in said program apparatus and a condition of said arbitrary device during execution of the programmed sequence program, said information being stored in said work memory and comprising an index qualification contents value and status of said arbitrary device.

2. A programmable controller according to claim 1, wherein said transmission means transmits said information concerning said arbitrary device and the condition thereof in accordance with a condition of an index specified by an operator.

3. A method of monitoring a sequence program, stored in a program memory of a programmable controller, said sequence program comprising a plurality of steps executable by a CPU unit to control the condition of at least one device, said method comprising the steps of:

identifying an arbitrary sequence step in a sequence program programmed in a CPU unit;

storing information relating to a device which is controlled in said arbitrary sequence step, said information including an index qualification contents value for a subroutine and a condition of the device, said information being stored in a work memory; and displaying said monitored index qualification contents value and said condition on the same display means.

4. A method according to claim 3, wherein said monitoring step further comprises:

specifying an arbitrary index condition; and executing said monitoring step when said specified index condition is satisfied.

5. A programmable controller comprising:

CPU unit means comprising a processor, first memory means, second memory means and a sequence program having a plurality of sequentially executable steps for operating said controller to control the condition of at least one device which is index qualified, said program being stored in said first memory means and said CPU unit means performing computations and storing the results of said computations in said second memory means;

a program apparatus comprising display means for displaying, for a selected sequence step in said sequence program, a device condition controlled by said sequence programs; and transmission means for providing communication between said CPU unit and said program apparatus for transmitting the identification of an arbitrary device having an index qualification for a subroutine in said program apparatus and a condition of said arbitrary device during execution of the programmed sequence program to said display means, said identification being stored in said second memory means and comprising an index qualification contents value.

6. A programmable controller according to claim 5, wherein said transmission means transmits an identification of said arbitrary device and the condition thereof in accordance with a condition of a specified index.

7. A programmable controller according to claim 5, further comprising third memory means for storing at least one of said sequence step number to be monitored, a device identifier before index qualification, an index and number, contents of said index after execution of said sequence step and the contents of said device after index qualification.

8. A programmable controller according to claim 7, wherein said third memory means stores at least said sequence step number to be monitored, device identifier after index qualification after execution of said step and the contents of said device after index qualification.

9. A programmable controller according to claim 7, further comprising within said program apparatus, means for issuing an interrupt to said CPU unit means at predetermined times for demanding transmission of data stored in said third memory means.

10. A method of monitoring a sequence program having a plurality of sequentially executable steps, comprising one or more of transmission, input and output executable commands and being executed by a programmable controller to control at least one device which may be index qualified, said method comprising the steps of:

storing the sequence program in a first memory;

executing said program in sequential step order and storing the results of said execution in a second memory;

identifying an arbitrary sequence step in said sequence program;

monitoring a device, which is controlled in said arbitrary sequence step, and storing information in said second memory, said information including an index qualification contents value for a subroutine and a condition thereof; and displaying said monitored index qualification and condition on the same display means.

11. A method according to claim 10, wherein said monitoring step further comprises specifying an arbitrary index condition, and executing said monitoring step when said specified index condition is satisfied.

12. A method according to claim 11, further comprising, interrupting said executing step on a predetermined basis, in order to detect the occurrence of said specified index condition.

13. A method according to claim 11, further comprising storing at least one of sequence step to be monitored, device and number before index qualification and index and number as initial data for monitoring.

14. A method according to claim 13, further comprising, after executing a stored sequence step to be monitored, storing the contents for index qualification for said step in a work memory.

15. A method according to claim 13, further comprising, after executing a stored sequence step to be monitored, storing the contents of the index for said step in a work memory.

16. A method according to claim 15, wherein immediately after each execution of the sequence step specified to be monitored, updating the contents of said work memory.

17. A method according to claim 16, further comprising:
interrupting said executing steps on a periodic basis to request said contents value; and
transmitting the monitoring function information from said work memory to said display means.

18. A method according to claim 17, further comprising; computing the device and number after index qualification from the contents value and causing the device, number and condition to be displayed on said display means.

19. A method according to claim 18, further comprising displaying on said display means, the device and number after index qualification and the On/OFF condition of said device from said monitoring step.

* * * * *